(12) United States Patent
Chen

(10) Patent No.: US 10,881,248 B2
(45) Date of Patent: Jan. 5, 2021

(54) COLLAPSIBLE HORIZONTAL VEGETABLE PROCESSOR

(71) Applicant: SHUANGMA PLASTIC MANUFACTURING INC., Taizhou (CN)

(72) Inventor: Cuihong Chen, Taizhou (CN)

(*) Notice: Subject to any disclaimer, the term of this patent is extended or adjusted under 35 U.S.C. 154(b) by 0 days.

(21) Appl. No.: 16/512,386

(22) Filed: Jul. 16, 2019

(65) Prior Publication Data

US 2019/0335954 A1 Nov. 7, 2019

Related U.S. Application Data

(63) Continuation of application No. PCT/CN2017/089558, filed on Jun. 22, 2017.

(30) Foreign Application Priority Data

Feb. 23, 2017 (CN) .................... 2017 2 0170701 U
May 20, 2017 (CN) .................... 2017 2 0564752 U

(51) Int. Cl.
*A47J 43/25* (2006.01)
*B26D 1/02* (2006.01)
(Continued)

(52) U.S. Cl.
CPC .............. *A47J 43/25* (2013.01); *B26D 1/02* (2013.01); *B26D 7/01* (2013.01); *B26D 7/2614* (2013.01); *B26D 3/26* (2013.01)

(58) Field of Classification Search
CPC .. A47J 43/25; B26D 1/02; B26D 3/26; B26D 7/00; B26D 7/01; B26D 7/26; B26D 7/2614

See application file for complete search history.

(56) References Cited

U.S. PATENT DOCUMENTS 1,771,434 A * 7/1930 Crawford .............. B26B 29/063
                                                                     83/762
5,456,149 A * 10/1995 Elsenheimer ........ B23D 35/008
                                                         29/24.5

(Continued)

FOREIGN PATENT DOCUMENTS

CN         2743101 Y     11/2005
CN     202723661 U     2/2013

(Continued)

OTHER PUBLICATIONS

Internation Search Report of PCT/CN2017/089558, dated Nov. 27, 2017.

*Primary Examiner* — Stephen Choi
(74) *Attorney, Agent, or Firm* — Erson IP(Nelson IP)

(57) ABSTRACT

A collapsible horizontal vegetable processor comprises a base (1) and a cutter frame holder (13). The cutter frame holder is detachably provided with a replaceable cutter frame (2). The base is provided with a sliding rail mechanism. The base comprises a fixed portion (11) and a collapsible portion (12). The cutter frame holder (13) is arranged on one side of the fixed portion, and the collapsible portion is arranged on the other side of the fixed portion. The sliding rail mechanism is slidably provided with a sliding seat (4). The sliding seat is provided with a sliding seat frame body (5) and a handle (6). Pressing teeth (51) used to fix vegetables and a rotating operation device (52) are arranged at the top of the sliding seat frame body. The sliding seat is driven by the handle to move on the sliding rail mechanism. The base of the vegetable processor is collapsible, thereby greatly reducing an occupied space.

9 Claims, 7 Drawing Sheets

(51) Int. Cl.
*B26D 7/01* (2006.01)
*B26D 7/26* (2006.01)
*B26D 3/26* (2006.01)

(56) References Cited

U.S. PATENT DOCUMENTS

| | | |
|---|---|---|
| 6,968,777 B2 | 11/2005 | Lin |
| 2015/0337889 A1 | 11/2015 | Repac |
| 2016/0257012 A1* | 9/2016 | Wong .................... B26D 7/0608 |
| 2016/0257013 A1* | 9/2016 | Exley ....................... B26D 3/11 |
| 2016/0271821 A1 | 9/2016 | Chen |
| 2018/0162003 A1* | 6/2018 | Plichon .................... B26D 3/26 |

FOREIGN PATENT DOCUMENTS

| | | |
|---|---|---|
| CN | 204525550 U | 8/2015 |
| CN | 105835114 A | 8/2016 |

\* cited by examiner

COLLAPSIBLE HORIZONTAL VEGETABLE PROCESSOR

CROSS-REFERENCE TO RELATED APPLICATIONS

This application is a continuation of International Patent Application No. PCT/CN2017/089558 with a filing date of Jun. 22, 2017, designating the United States, now pending, and claims the priority to Chinese Patent Application No. 201720170701.9 with a filing date of Feb. 23, 2017, and further claims the priority to Chinese Patent Application No. 201720564752.X with a filing date of May 20, 2017. The content of the aforementioned applications, including any intervening amendments thereto, are incorporated herein by reference.

TECHNICAL FIELD

The utility model belongs to the technical field of kitchen equipment, and particularly relates to a collapsible horizontal vegetable processor.

BACKGROUND OF THE PRESENT INVENTION

A food processor is an appliance for processing food. A general food processor is used to slice, grate or stir vegetables or fruits. The food processor can be classified into a vertical food processor and a horizontal food processor according to its working states. The existing vertical food processor generally needs to hold the material to be processed against a blade during operation, and cuts the material by the push of one hand, and the other hand needs to be placed on the food processor to facilitate the fixation. This use mode is not convenient, not safe, and time-consuming and effort-consuming. At the same time, the existing vertical food processor can only be used for stirring or slicing, and generally can only cut out slices with one shape and size, and its function is single.

SUMMARY OF PRESENT INVENTION

In view of the above technical defects, the utility model provides a horizontal vegetable processor which is convenient in use and capable of folding a base, occupying less space during storage and reducing package cost and transportation cost.

The purpose of the utility model is achieved as follows:

A collapsible horizontal vegetable processor comprises a base and a cutter frame holder, wherein the cutter frame holder is detachably provided with a replaceable cutter frame; the base is provided with a sliding rail mechanism; the base comprises a fixed portion and a collapsible portion; the cutter frame holder is arranged on one side of the fixed portion, and the collapsible portion is arranged on the other side of the fixed portion; the sliding rail mechanism is slidably provided with a sliding seat; the sliding seat is provided with a sliding seat frame body and a handle; pressing teeth used to fix vegetables and a rotating operation device are arranged at the top of the sliding seat frame body; and the sliding seat is driven by the handle to move on the sliding rail mechanism.

The sliding rail mechanism comprises a sliding rail mechanism I fixedly installed on an upper surface of the fixed portion and a sliding rail mechanism II slidably installed on an upper surface of the collapsible portion; the sliding rail mechanism I is detachably connected to the sliding rail mechanism II; and the collapsible portion can be folded upwards when the sliding rail mechanism II moves outwards away from the sliding rail mechanism I.

A cutting blade for cutting vegetables is fixedly installed on the cutter frame holder; an installing hole I is formed in the cutter frame holder; the replaceable cutter frame is detachably installed in the installing hole I; and a certain angle is formed between the replaceable cutter frame and the cutting blade.

The fixed portion is provided with an installing cavity which is open laterally; a storing box is slidably installed in the installing cavity; a plurality of storing grooves are arranged in the storing box; and a plurality of replaceable cutter frames are placed in the storing grooves.

A sucker installing seat is formed on the collapsible portion; a sucker component is installed in the sucker installing seat; the sucker component comprises a sucker and a sucker core; the sucker is fixed to the sucker installing seat; a lifting portion is arranged in the middle of the sucker core; and the lifting portion penetrates through a center hole of the sucker and is arranged in the sucker installing seat.

The sucker component further comprises a sucker locking device; the sucker locking device comprises a sucker pulling rod and a sucker wrench; the upper end of the lifting portion is provided with a hole slot; one end of the sucker pulling rod penetrates through a through hole on the side surface of the collapsible portion and the hole slot of the sucker core, and then is placed on the side surface of the collapsible portion; the sucker wrench is fixed to the other end of the sucker pulling rod; and as the sucker pulling rod rotates, the sucker core is pushed or lifted by the lifting portion.

A limiting bulge is formed on the sliding rail mechanism II; correspondingly, an empty slot is formed on the lower end of the sliding seat; and when the sliding seat moves on the sliding rail mechanism II, the limiting bulge can penetrate through the empty slot.

An installing hole II is formed in the sliding seat; a sliding block is slidably installed in the installing hole II; and the sliding seat is locked on and separated from the sliding rail mechanism through the slide of the sliding block.

An installing seat is also formed on the sliding seat; and the installing seat is hinged with the handle.

The length of the sliding seat is smaller than the length of the fixed portion.

Compared with the prior art, the utility model has the following outstanding and beneficial technical effects:

1. The base of the utility model comprises the fixed portion and the collapsible portion. The collapsible portion is hinged to the fixed portion. When the vegetable processor of the utility model is not used, the collapsible portion can be folded upwards, thereby greatly reducing the space occupied by the entire structure, reducing the packaging volume in the transportation process, and reducing the cost of production, package and transportation. When the vegetable processor is used at home, the vegetable processor is easy to store and occupies less space.

2. The cutter frame holder of the utility model is detachably provided with the replaceable cutter frame, and the storing box is arranged at the fixed portion of the base. A plurality of replaceable cutter frames with the same or different models are arranged in the storing box. The replaceable cutter frames can be replaced according to the actual needs of the user, so as to make full use of the space. The plurality of replaceable cutter frames are provided for the utility model, so that the utility model is convenient in use and wide in application range.

3. The fixed portion of the utility model is provided with the installing cavity which is open forwards. The storing box is slidably installed in the installing cavity; and a plurality of replaceable cutter frames for replacement are stored in the storing box. The storing box is directly installed in the base, so as to make full use of the space. For replacement, the storing box is pulled out to take out the replaceable cutter frames inside, which is convenient in use and saves time.

4. The collapsible portion of the utility model is provided with a sucker device. The sucker device comprises a sucker component and a sucker locking device. The sucker device can stably fix the collapsible portion to a table in use, so as to avoid shaking in use and realize reasonable design, convenient use, labor saving and stable structure.

5. A plurality of portions of the utility model are detachably connected, which is convenient for disassembly, storage, package or transportation, thereby occupying less space and saving the package cost. It is also convenient to replace a component that is damaged due to long use time, thereby prolonging the overall service life.

DETAILED DESCRIPTION OF PREFERRED EMBODIMENTS

Figure 1:
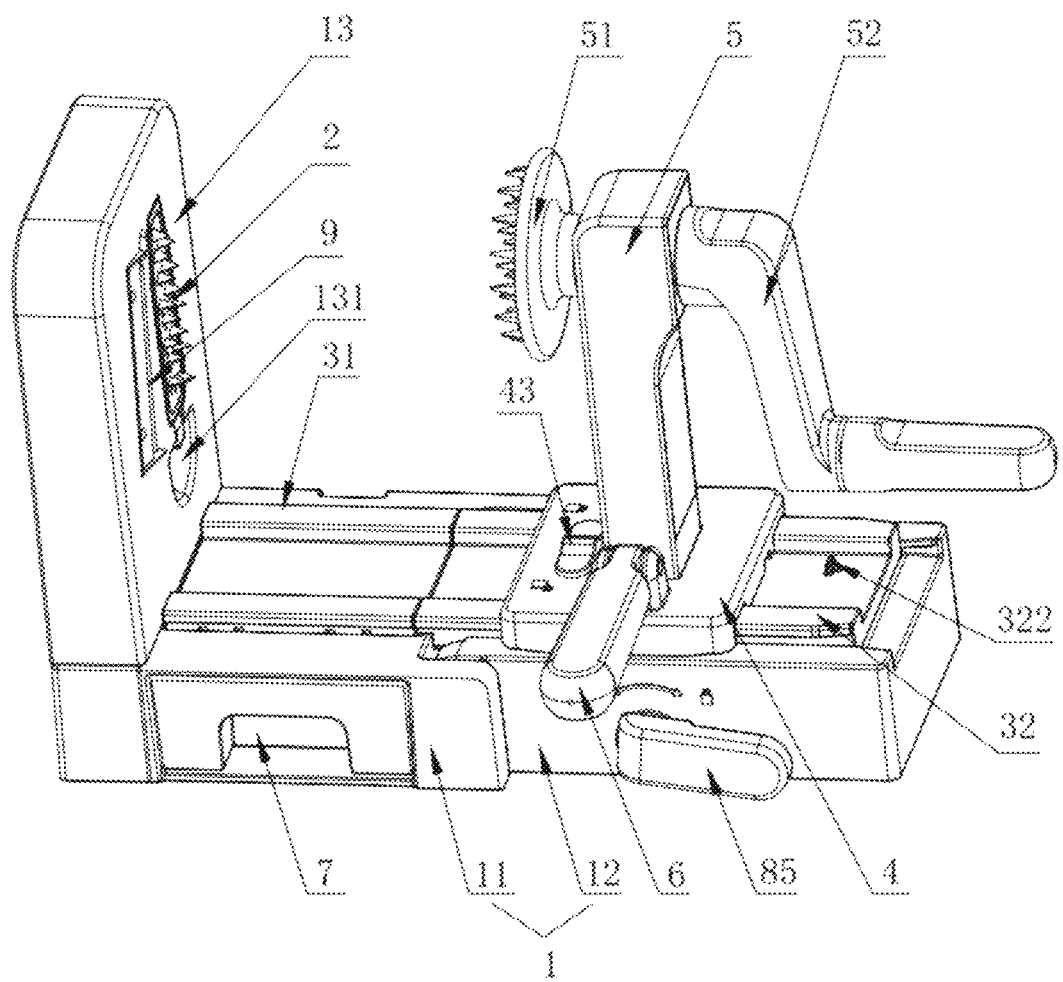
FIG. 1 is a structural schematic diagram of the utility model.
Figure 2:
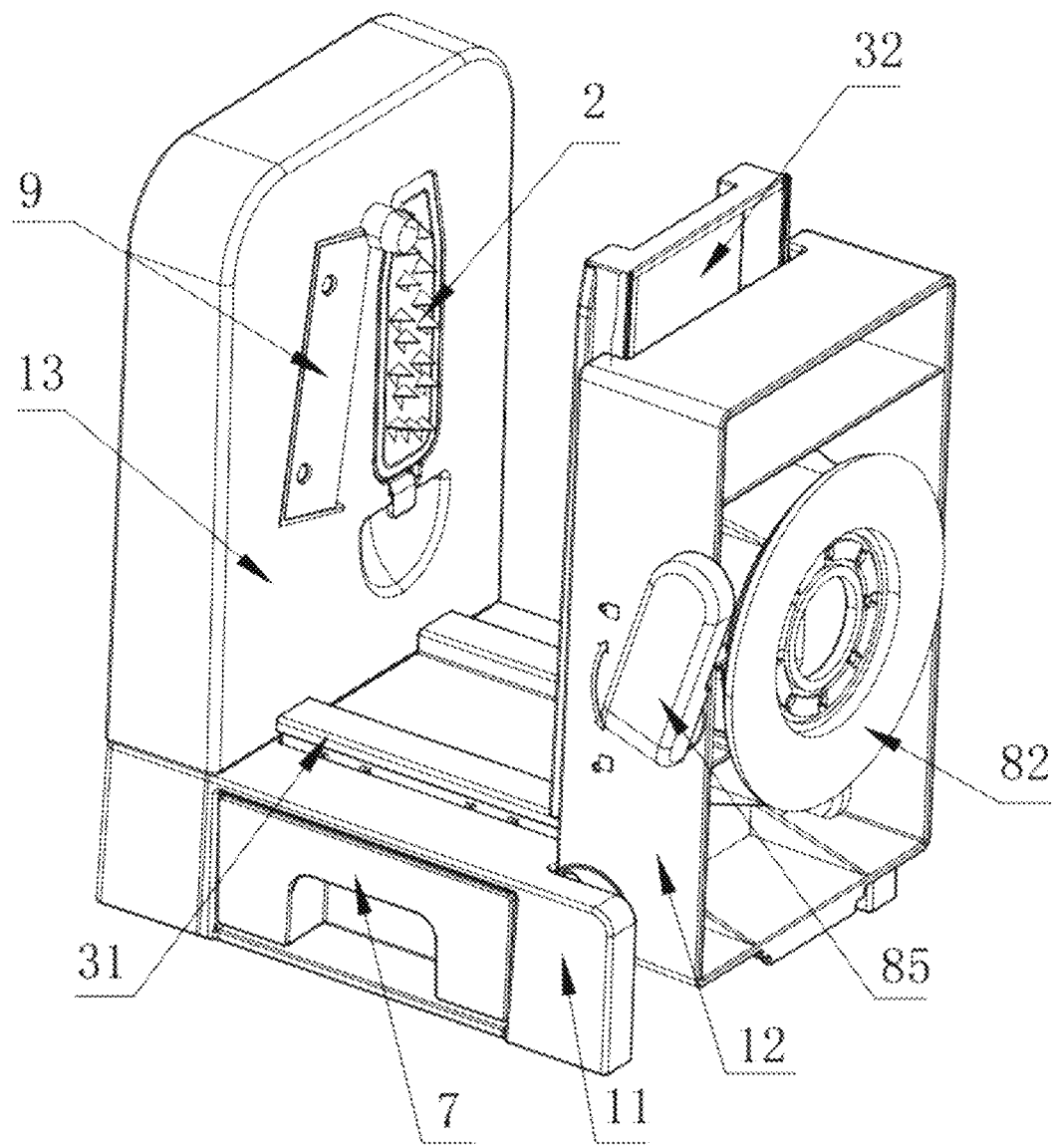
FIG. 2 is a structural schematic diagram of a folded base of the utility model.

The utility model is further described below with reference to the drawings and through specific embodiments, as shown in FIG. 1 to FIG. 7:

As shown in FIG. 1 and FIG. 2, a horizontal vegetable processor comprises a collapsible base 1, and a sliding rail mechanism and a cutter frame holder 13 which are arranged on an upper surface of the base 1. The base 1 comprises a fixed portion 11. The cutter frame holder 13 is arranged on one end of the fixed portion 11. The cutter frame holder 13 is provided with a replaceable cutter frame 2. A collapsible portion 12 is hinged on the other end of the fixed portion 11. The sliding rail mechanism comprises a sliding rail mechanism I31 fixedly arranged on an upper surface of the fixed portion 11 and a sliding rail mechanism II32 slidably arranged on an upper surface of the collapsible portion 12. The sliding rail mechanism is slidably provided with a sliding seat 4. The sliding seat 4 is provided with a sliding seat frame body 5 and a handle 6. Pressing teeth 51 used to fix vegetables and fruits and a rotating operation device 52 are arranged at the top of the sliding seat frame body 5. In the use process, one hand holds the handle 6, and the other hand rotates the rotating operation device 52, so as to drive the sliding seat 4 to move on the sliding rail mechanism.

Figure 3:
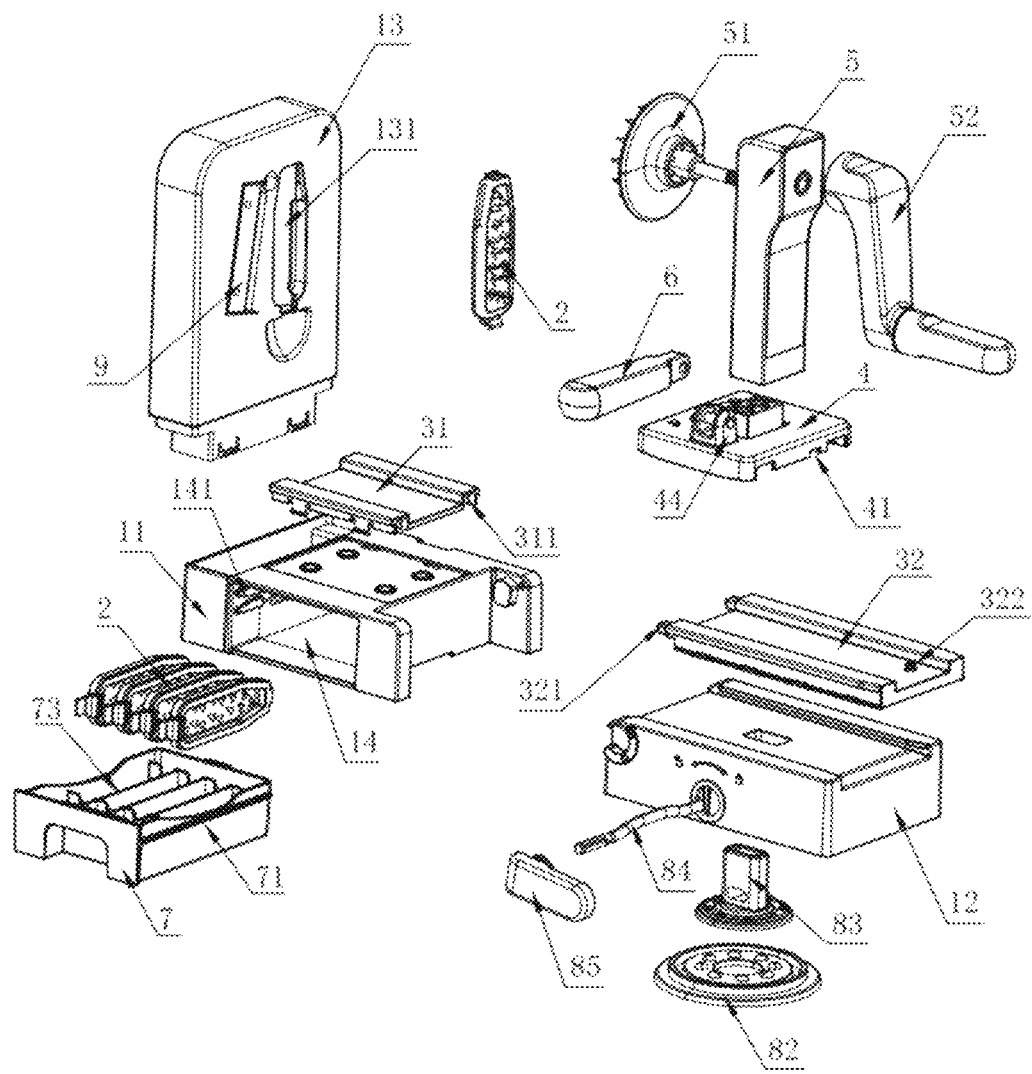
FIG. 3 is a structural exploded diagram of a collapsible horizontal vegetable processor of the utility model.
Figure 6:
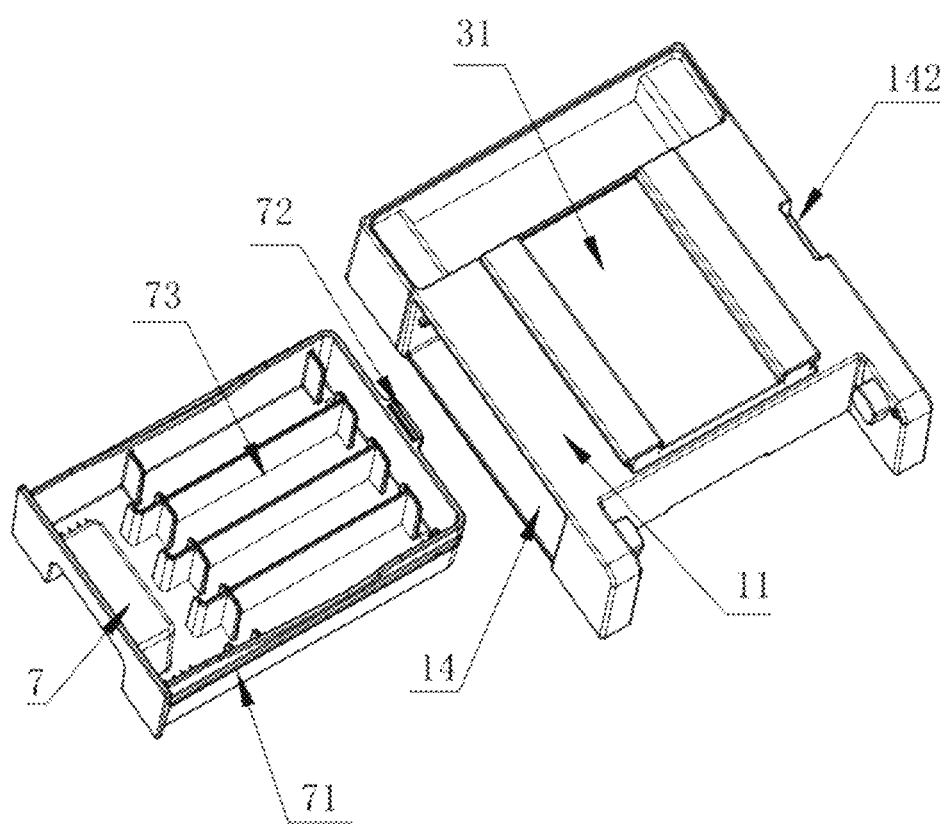
FIG. 6 is a structural exploded diagram of a sliding seat of the utility model.

As shown in FIG. 3 and FIG. 6, a cutting blade 9 for cutting vegetables is fixedly installed on the cutter frame holder 13; an installing hole I131 is formed in the cutter frame holder 13; the replaceable cutter frame 2 is detachably installed in the installing hole I131; and a certain angle is formed between the replaceable cutter frame 2 and the cutting blade 9. A round hole blade is installed at the angle position. The fixed portion 11 is provided with an installing cavity 14 which is open forwards. A storing box 7 is slidably installed in the installing cavity 14. Limiting groves 141 are formed in inner walls of the left side and the right side of the installing cavity 14. A limiting hole 142 is formed at the rear side wall of the installing cavity 14. Correspondingly, sliding strips 71 are formed at the left side and the right side of the storing box 7. A limiting block 72 is formed at the rear end of the string box 7. During installation, the sliding strips 71 of the storing box slide into the limiting groove 141 of the installing cavity 14, and the limiting block 72 is just clamped in the limiting hole 142, so that the storing box 7 is firmly installed in the installing cavity 14. Meanwhile, a plurality of storing groves 73 are arranged in the storing box 7. A plurality of replaceable cutter frames 2 with the same or different models are placed in the storing groves 73, and can be replaced. The application range is increased, and meanwhile, the replaceable cutter frames 2 are easily abraded after used for a long time. After abraded, the replaceable cutter frames 2 are replaced, thereby prolonging the service life of the entire mechanism.

As shown in FIG. 3, a clamping hole 311 is formed at one end of the sliding rail mechanism I31. A clamping block 321 is formed at one end of the sliding rail mechanism II32 near the sliding rail mechanism I31. When the base 1 is unfolded, the clamping block 321 is clamped into the clamping hole 311 so that the sliding rail mechanism I and the sliding rail mechanism II are connected into a whole and the sliding seat can slide on the sliding rail mechanism I and the sliding rail mechanism II. When the collapsible portion needs to be folded, the sliding rail mechanism II32 only needs to move outwards away from the sliding rail mechanism I31, so as to upwards fold the collapsible portion 12. FIG. 2 shows a folded state.

Figure 4:
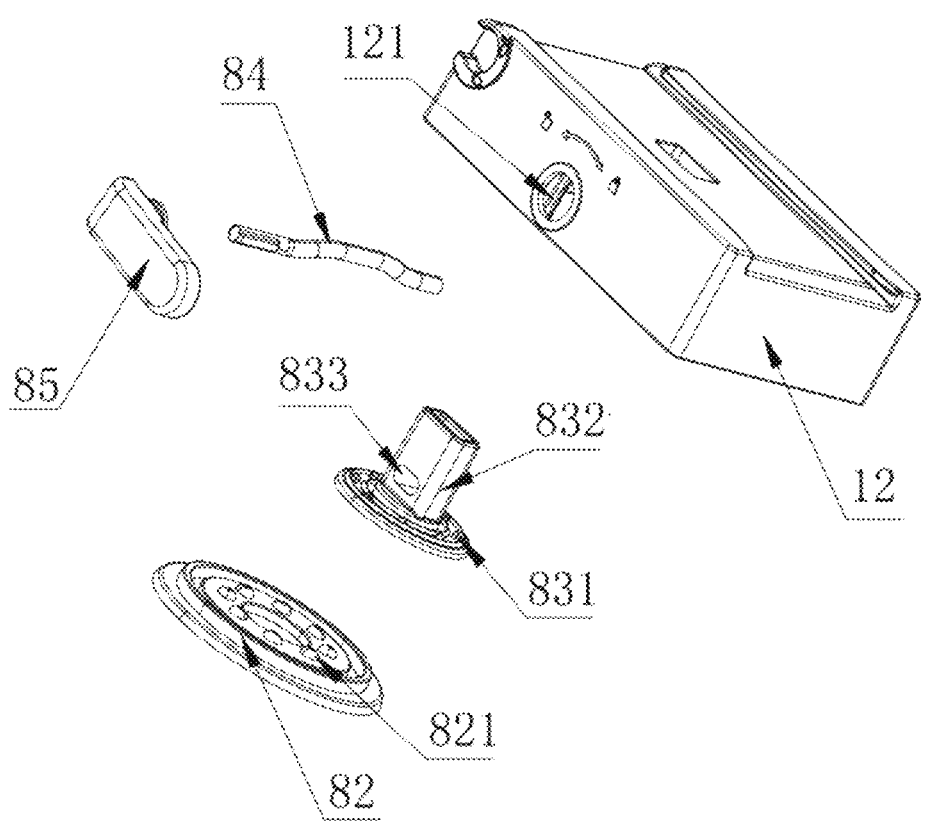
FIG. 4 is a structural exploded diagram I of a sucker component of the utility model.
Figure 5:
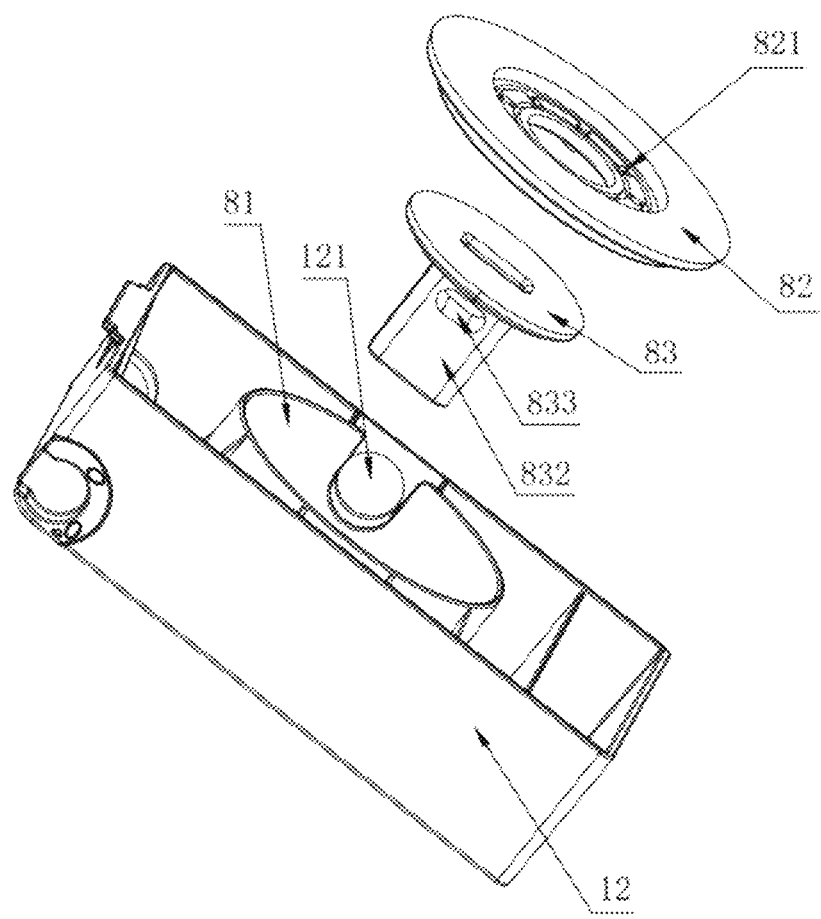
FIG. 5 is a structural exploded diagram II of a sucker component of the utility model.

As shown in FIG. 3 to FIG. 5, a sucker installing seat 81 is formed on the collapsible portion 12; a sucker component is installed in the sucker installing seat 81; the sucker component comprises a sucker 82 and a sucker core 83; the sucker 82 is fixed to the sucker installing seat 81; the edge of the sucker 82 is provided with a pit 821, and correspondingly, the core edge of the sucker core 83 is provided with a bulge 831; the bulge 831 on the sucker core 83 is inserted into and overlapped with the pit 821 of the sucker 82, and then is inserted into the sucker installing seat 81; a lifting portion 832 is arranged in the middle of the sucker core 83; and the lifting portion 832 penetrates through a center hole of the sucker 82 and is arranged in the sucker installing seat 81. The sucker component further comprises a sucker locking device; the sucker locking device comprises a curved sucker pulling rod 84 and a sucker wrench 85; the upper end of the lifting portion 832 is provided with a hole slot 833; one end of the sucker pulling rod 84 penetrates through a through hole 121 on the side surface of the collapsible portion 12 and the hole slot 833 of the sucker core 83, and then is placed on the side surface of the collapsible portion 12; the sucker wrench 85 is fixed to the other end of the sucker pulling rod 84 and is located outside the through hole 121 on the side surface of the collapsible portion 12; the sucker wrench 85 is pulled, and as the sucker pulling rod 84 rotates, the sucker pulling rod 84 drives the lifting portion 832 to push or lift the sucker core 83, thereby achieving the effects of suction and release of the sucker.

Figure 7:
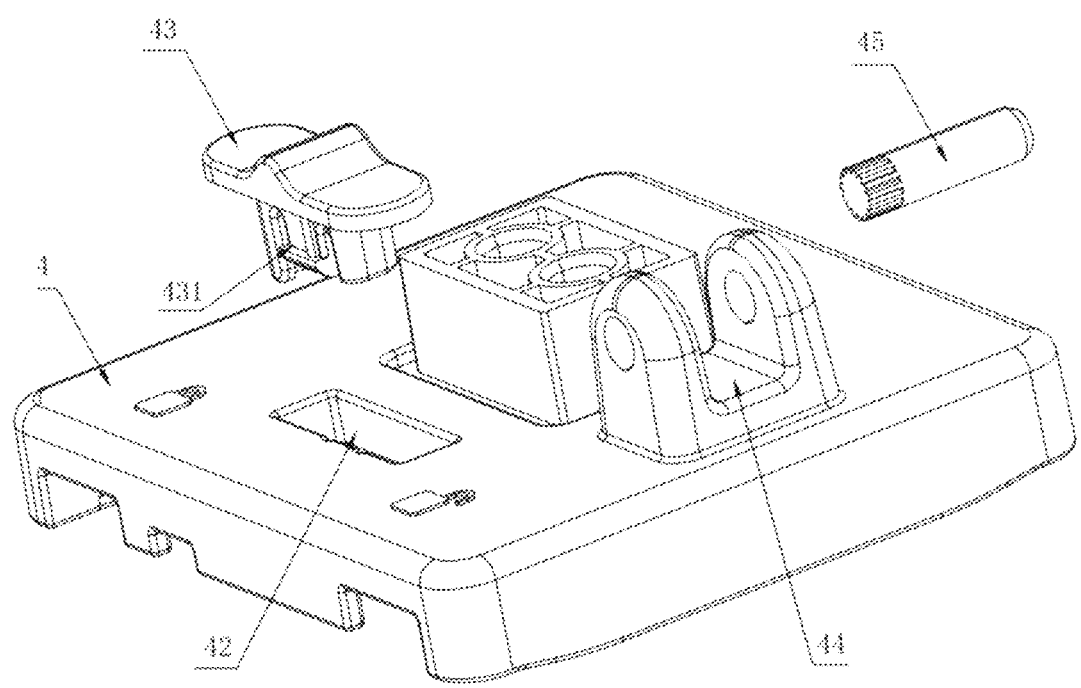
FIG. 7 is a structural schematic diagram of a fixed portion and a storing box of the utility model.

As shown in FIG. 1 and FIG. 3, a limiting bulge 322 is formed on the sliding rail mechanism II32; and correspondingly, an empty slot 41 is formed on the lower end of the sliding seat 4. As shown in FIG. 7, an installing hole II42 is also formed in the sliding seat 4; a sliding block 43 is slidably installed in the installing hole II42; and a convex block 431 is formed at the lower end of the sliding block 43 to slide the sliding block towards the empty slot 41. When the sliding seat slides on the sliding rail mechanism II32, the sliding seat cannot separate from the sliding rail mechanism II due to the barrier between the convex block 431 and the limiting bulge, so that the sliding seat 4 is locked on the sliding rail mechanism II32. The sliding block slides away from the empty slot 41, and the limiting bulge 322 can penetrate through the empty slot 41 so that the sliding block 43 can separate from the sliding rail mechanism II when sliding.

As shown in FIG. 7, an installing seat 44 is also formed on the sliding seat 4; the handle 6 is connected to the installing seat 44 through a hinging shaft 45; and one end of the hinging shaft is in the shape of a gear, and is provided with a plurality of gear teeth. When the handle rotates to a certain position, due to the engagement between the gear teeth and the installing seat, the handle can be maintained in this position without shaking, thereby enhancing the stability of the handle.

The length of the sliding seat 4 is smaller than the length of the fixed portion 11. When the collapsible portion is folded, the sliding seat can be put on the fixed portion and the rotating operation device on the sliding seat frame body is disassembled and put on the fixed portion, thereby reducing the occupied space and facilitating the storage and the package.

The working principle of the utility model is as follows:

During use, the base is unfolded and the sucker wrench is pulled to fix the base to the table. One end of the fruit and vegetable to be processed is inserted into the pressing teeth, and the other end is in contact with the cutting blade and a replaceable blade on the cutter frame holder. The user rotates the rotating operation device with one hand so that the pressing teeth drive the fruit and the vegetable to be processed to rotate, and holds the handle with the other hand to push the sliding seat to slide on the sliding rail mechanism, thereby completing the cutting work of the fruit and the vegetable. After the cutting work is completed, the sucker wrench is pulled to release the sucker. The sliding seat moves onto the fixed portion, and the rotating operation device is disassembled. The sliding rail mechanism II moves outwards to separate from the sliding rail mechanism I, and the collapsible portion is folded upwards, so as to complete the folding of the base. The rotating operation device is put in a space between the collapsible portion and the cutter frame holder.

Those skilled in the art shall understand that the utility model is not limited by the above embodiments. The above embodiments and the description merely describe the principles that illustrate the utility model, and various changes and improvements can also be made to the utility model without departing from the spirit and scope of the utility model. These changes and improvements fall within the protection scope of the utility model. The protection scope of the utility model is defined by the appended claims and equivalents.

I claim:

1. A collapsible horizontal vegetable processor, comprising a base that is collapsible and a cutter frame holder, wherein the cutter frame holder is detachably provided with a replaceable cutter frame;
   the base is provided with a sliding rail mechanism; the base comprises a fixed portion and a collapsible portion;
   the cutter frame holder is arranged on one side of the fixed portion, and the collapsible portion is arranged on the other side of the fixed portion; the sliding rail mechanism is slidably provided with a sliding seat;
   the sliding seat is provided with a sliding seat frame body and a handle;
   pressing teeth used to fix vegetables and a rotating operation device are arranged at the top of the sliding seat frame body;
   and the sliding seat is driven by the handle to move on the sliding rail mechanism,
   wherein the sliding rail mechanism comprises a sliding rail mechanism I fixedly installed on an upper surface of the fixed portion and a sliding rail mechanism II slidably installed on an upper surface of the collapsible portion;
   when the processor is in use, the fixed portion is connected to the collapsible portion in a horizontal plane to enable the sliding rail mechanism I and the sliding rail mechanism II to form a horizontal sliding rail where the sliding seat is seated;
   when the processor is not in use, the collapsible portion is configured to be folded vertically with respect to the fixed portion, and the sliding rail mechanism II is configured to be disconnected with the sliding rail mechanism I by moving the sliding rail mechanism II outwards away from the sliding rail mechanism I, the sliding seat is configured to be put on the fixed portion, and the rotating operation device is configured to be placed in a space between the collapsible portion and the cutter frame holder.

2. The collapsible horizontal vegetable processor according to claim 1, wherein a cutting blade for cutting vegetables is fixedly installed on the cutter frame holder;
   an installing hole I is formed in the cutter frame holder; the replaceable cutter frame is detachably installed in the installing hole I; and a certain angle is formed between the replaceable cutter frame and the cutting blade.

3. The collapsible horizontal vegetable processor according to claim 1, wherein the fixed portion is provided with an installing cavity which is open laterally; a storing box is slidably installed in the installing cavity; a plurality of storing grooves are arranged in the storing box; and a plurality of replaceable cutter frames are placed in the storing grooves.

4. The collapsible horizontal vegetable processor according to claim 1, wherein a sucker installing seat is formed on the collapsible portion; a sucker component is installed in the sucker installing seat; the sucker component comprises a sucker and a sucker core; the sucker is fixed to the sucker installing seat; a lifting portion is arranged in the middle of the sucker core; and the lifting portion penetrates through a center hole of the sucker and is arranged in the sucker installing seat.

5. The collapsible horizontal vegetable processor according to claim 4, wherein the sucker component further comprises a sucker locking device; the sucker locking device comprises a sucker pulling rod and a sucker wrench; the upper end of the lifting portion is provided with a hole slot; one end of the sucker pulling rod penetrates through a through hole on the side surface of the collapsible portion and the hole slot of the sucker core, and then is placed on the side surface of the collapsible portion; the sucker wrench is fixed to the other end of the sucker pulling rod; and as the sucker pulling rod rotates, the sucker core is pushed or lifted by the lifting portion.

6. The collapsible horizontal vegetable processor according to claim 1, wherein a limiting bulge is formed on the sliding rail mechanism II; correspondingly, an empty slot is formed on a lower end of the sliding seat; and when the sliding seat moves on the sliding rail mechanism II, the limiting bulge is configured to penetrate through a surface that forms the empty slot.

7. The collapsible horizontal vegetable processor according to claim 1, wherein an installing hole II is formed in the sliding seat; a sliding block is slidably installed in the installing hole II; and the sliding seat is locked on and separated from the sliding rail mechanism through the slide of the sliding block.

8. The collapsible horizontal vegetable processor according to claim 1, wherein an installing seat is also formed on the sliding seat; and the installing seat is hinged with the handle.

9. The collapsible horizontal vegetable processor according to claim 1, wherein the length of the sliding seat is smaller than the length of the fixed portion.

\* \* \* \* \*